(12) United States Patent
Xu et al.

(10) Patent No.: US 7,804,781 B2
(45) Date of Patent: Sep. 28, 2010

(54) METHODS AND APPARATUS TO DETECT BORDER GATEWAY PROTOCOL SESSION FAILURES

(75) Inventors: Zhijian Xu, Duluth, GA (US); Paritosh Bajpay, Edison, NJ (US); Monowar Hossain, Middletown, NJ (US); Chen-Yui Yang, Marlboro, NJ (US); David H. Lu, Morganville, NJ (US); Luis Figueroa, Spotswood, NJ (US)

(73) Assignee: AT&T Intellectual Property I, L.P., Reno, NV (US)

( * ) Notice: Subject to any disclaimer, the term of this patent is extended or adjusted under 35 U.S.C. 154(b) by 82 days.

(21) Appl. No.: 12/275,055

(22) Filed: Nov. 20, 2008

(65) Prior Publication Data

US 2010/0124170 A1   May 20, 2010

(51) Int. Cl.
*G01R 31/08* (2006.01)
*H04L 12/26* (2006.01)
*H04L 12/56* (2006.01)

(52) U.S. Cl. .................. 370/242; 370/248; 370/401
(58) Field of Classification Search .............. None
See application file for complete search history.

(56) References Cited

U.S. PATENT DOCUMENTS

| | | | |
|---|---|---|---|
| 6,339,595 B1 | 1/2002 | Rekhter et al. | |
| 7,184,942 B2 | 2/2007 | Graves et al. | |
| 7,272,643 B1 | 9/2007 | Sarkar et al. | |
| 7,369,556 B1 | 5/2008 | Rekhter et al. | |
| 7,565,449 B2 * | 7/2009 | D'Souza et al. | 709/242 |
| 7,664,043 B1 * | 2/2010 | D'Souza et al. | 370/242 |
| 2002/0021675 A1 | 2/2002 | Feldmann | |
| 2002/0199016 A1 * | 12/2002 | Freedman | 709/241 |
| 2004/0034702 A1 | 2/2004 | He | |
| 2004/0081154 A1 | 4/2004 | Kouvelas | |
| 2004/0088405 A1 * | 5/2004 | Aggarwal | 709/224 |
| 2005/0050176 A1 * | 3/2005 | Ilnicki et al. | 709/220 |
| 2006/0092976 A1 | 5/2006 | Lakshman et al. | |
| 2006/0193252 A1 * | 8/2006 | Naseh et al. | 370/225 |
| 2006/0209682 A1 | 9/2006 | Filsfils et al. | |
| 2006/0233181 A1 | 10/2006 | Raszuk et al. | |

(Continued)

OTHER PUBLICATIONS

Patrick et al., "Peering Dragnet: Anti-Social Behavior Amongst Peers, and What You Can Do About It," NANOG 38, Oct. 9, 2006 (30 pages).

(Continued)

*Primary Examiner*—Chi H Pham
*Assistant Examiner*—Soon-Dong D Hyun
(74) *Attorney, Agent, or Firm*—Hanley, Flight & Zimmerman, LLC (57) ABSTRACT

Methods and apparatus to detect border gateway protocol (BGP) session failures are disclosed. A disclosed example apparatus comprises a database interface to obtain provisioned configuration information for a provider edge (PE) router, a BGP engine to receive one or more BGP messages from a route reflector, the one or more BGP messages representing a list of active routes for the PE router, and a session analyzer to compare the list of active routes with the provisioned configuration information to determine whether a provisioned route is not present in the list of active routes, and to declare a BGP session failure when the provisioned route is not present in the list of active routes.

13 Claims, 6 Drawing Sheets

U.S. PATENT DOCUMENTS

| | | | |
|---|---|---|---|
| 2007/0091793 A1 | 4/2007 | Filsfils et al. | |
| 2007/0121486 A1* | 5/2007 | Guichard et al. | 370/216 |
| 2007/0140133 A1 | 6/2007 | Gudipalley et al. | |
| 2007/0153763 A1* | 7/2007 | Rampolla et al. | 370/351 |
| 2007/0171817 A1 | 7/2007 | Fujita et al. | |
| 2007/0177523 A1 | 8/2007 | Nagami et al. | |
| 2007/0180105 A1 | 8/2007 | Filsfils et al. | |
| 2007/0223486 A1 | 9/2007 | Farid et al. | |
| 2007/0226325 A1 | 9/2007 | Bawa et al. | |
| 2007/0226630 A1 | 9/2007 | Farid et al. | |
| 2008/0091803 A1 | 4/2008 | Liu | |
| 2008/0172732 A1 | 7/2008 | Li et al. | |
| 2009/0262660 A1* | 10/2009 | Watari et al. | 370/253 |
| 2009/0290498 A1* | 11/2009 | Bajpay et al. | 370/242 |

OTHER PUBLICATIONS

Feamster et al., "Borderguard: Detecting Cold Potatoes from Peers," IMC'04, pp. 213-218, held on Oct. 25-27, 2004 (6 pages).

* cited by examiner

METHODS AND APPARATUS TO DETECT BORDER GATEWAY PROTOCOL SESSION FAILURES

FIELD OF THE DISCLOSURE

This disclosure relates generally to border gateway protocols (BGPs) and, more particularly, to methods and apparatus to detect BGP session failures.

BACKGROUND

Enterprise customers are increasingly adopting multiprotocol label switching (MPLS) based VPN services to implement a communication network among their respective customer sites via a service provider's network. Such MPLS-based VPNs provide direct any-to-any reachability among an enterprise's customer sites. A BGP is traditionally used to route data within a communication network and/or between different communication networks.

DETAILED DESCRIPTION

Example methods and apparatus to detect border gateway protocol (BGP) session failures are disclosed. A disclosed example apparatus includes a database interface to obtain provisioned configuration information for a provider edge (PE) router, a BGP engine to receive one or more BGP messages from a route reflector, the one or more BGP messages representing a list of active routes for the PE router; and a session analyzer to compare the list of active routes with the provisioned configuration information to determine whether a provisioned route is not present in the list of active routes, and to declare a BGP session failure when the provisioned route is not present in the list of active routes A disclosed example method includes obtaining provisioning data for a PE router, receiving one or more BGP messages from a route reflector, the one or more BGP messages representing a list of active routes for the PE router, comparing the list of active routes with the provisioning data to determine whether a provisioned route is not present in the list of active routes, and declaring a BGP session failure when the provisioned route is not present in the list of active routes In the interest of brevity and clarity, throughout the following disclosure references will be made to an example communication system 100 of FIG. 1. However, the methods and apparatus described herein to detect BGP session failures are applicable to other types of networks constructed using other network technologies, topologies and/or protocols. As described herein, a BGP session failure may be caused by, for example, one or more routes that are down, inoperable and/or flapping, and/or one or more routers and/or network interfaces that are down, inoperable and/or flapping. The examples disclosed herein may also be used to detect the cause(s) and/or type(s) of BGP session failure(s) that have and/or are occurring.

Figure 1:
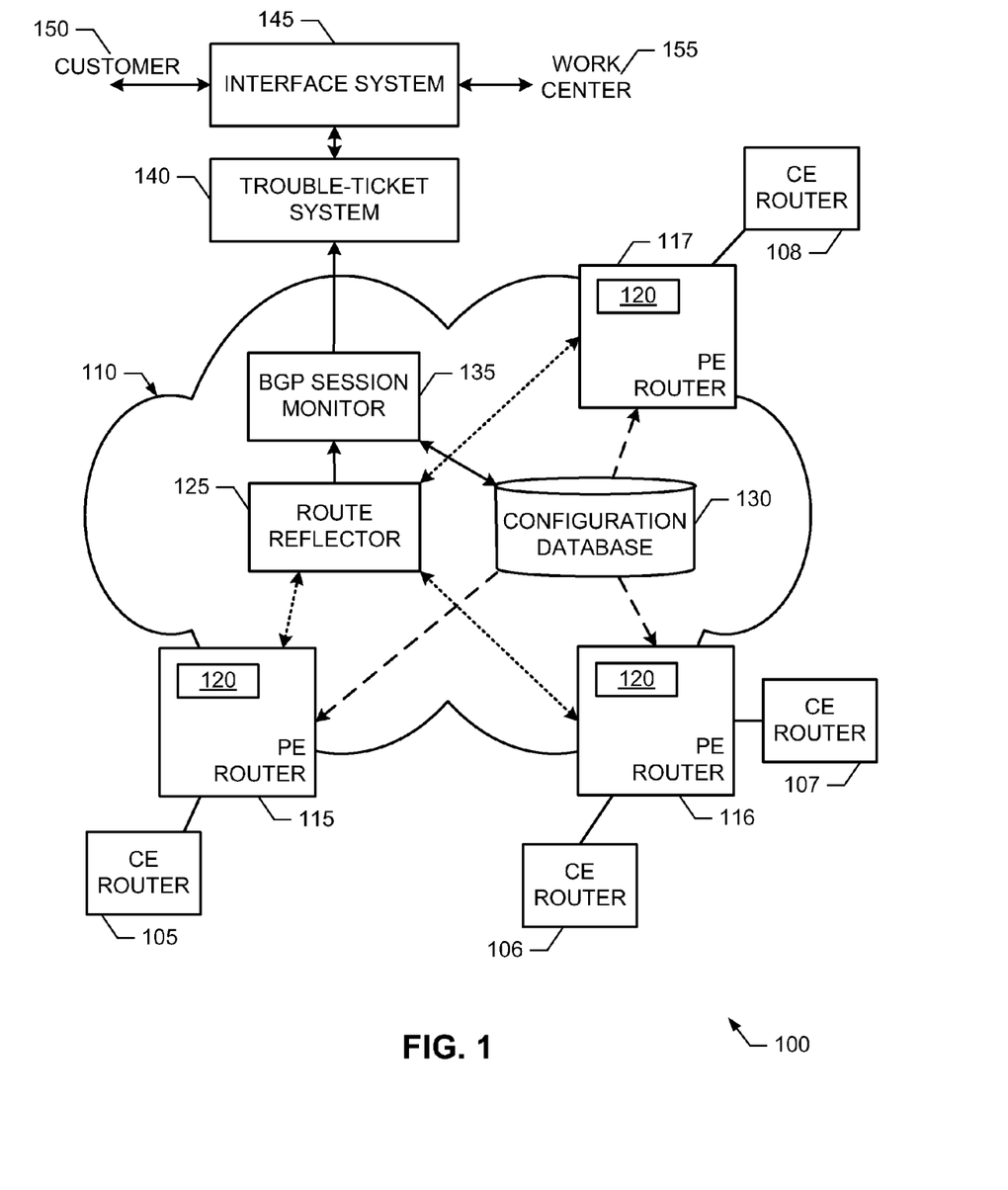
FIG. 1 is a schematic illustration of example communication system constructed in accordance with the teachings of this disclosure.

FIG. 1 illustrates the example communication system 100. To facilitate communication services between a plurality of customer edge (CE) routers, four of which are designated at reference numerals 105, 106, 107, and 108, the example communication system 100 of FIG. 1 includes a multiprotocol label switching (MPLS) based service-provider network 110. While for ease of illustration and discussion, all of the example CE routers 105-108 are associated with a single virtual private network (VPN), the example communication system 100 of FIG. 1 may facilitate communication services for any number of VPNs.

To route and/or transport data between and/or among the example CE routers 105-108, the example MPLS-based service-provider network 110 of FIG. 1 includes a plurality of PE routers, three of which are designated at reference numerals 115, 116, and 117. The example PE routers 115-117 of FIG. 1 are communicatively coupled to each other via any number and/or type(s) of communication paths (not shown) that allow any particular PE router 115-117 to communicate with at least some, but not necessarily all of, the other PE routers 115-117.

For each VPN implemented by the service-provider network 110, each of the example PE routers 115-117 of FIG. 1 has a corresponding VPN routing and forwarding (VRF) table. In the illustrated example of FIG. 1, the PE routers 115-117 have a VRF table 120 for the example VPN that communicatively couples the CE routers 105-108. The example VRF tables 120 of FIG. 1 are used by the example PE routers 115-117 to route and/or forward a packet received at a particular PE router 115-117 to and/or toward its final destination. In general, when a packet is received at a PE router 115-117 from a CE router 105-108 associated with a particular VPN, the PE router 115-117 uses the final destination specified and/or identified in the packet to perform a query of the VRF table 120 associated with that VPN. Based on a result of the query, the PE router 115-117 determines how the packet is to be routed or forwarded within the service provider network 110, and/or delivered to a particular CE router 105-108.

By sending, for example, BGP route advertisements, each of the example PE routers 115-117 of FIG. 1 publishes and/or exports information concerning the CE router(s) 105-108 that are currently and/or actively communicatively coupled to the PE router 115-117. Isolation between different VPNs is achieved via route targets (RTs), import policies and export policies. Specifically, all routes of a particular VPN are tagged with an RT parameter and/or value associated with the VPN. For example, when the example PE router 116 sends a BGP advertisement containing information regarding the CE router 105 associated with VPN A that is communicatively coupled to the PE router 116, the BGP advertisement includes the RT A that is associated with VPN A. Based on received BGP route advertisements, the example PE routers 115-117 of FIG. 1 build, compile, update, maintain and/or construct a VRF table for each VPN. Specifically, when the example PE routers 115-117 receive BGP advertisements tagged with an RT associated with a particular VPN, they import those routes only into the VRF table associated with that VPN, as dictated by the VPN's import policy(-ies).

To facilitate sharing of routing information among the example PE routers 115-117, the example service provider network 110 of FIG. 1 includes any number of route reflectors, route servers, intelligent route reflectors and/or intelligent route service control points, one of which is designated at reference numeral 125. Because not all of the example PE routers 115-117 are necessarily communicatively coupled in a full mesh topology (for example, when at least one PE router 115-117 does not have a direct communication path to another PE router 115-117), the example route reflector 125 of FIG. 1 forwards BGP advertisements among and/or to the PE routers 115-117. By forwarding each received BGP advertisement, the example route reflector 125 enables each of the PE routers 115-117 to build, compile and/or construct a VRF table for each VPN that can be used by the PE router 115-117 to route data from any CE router 105-108 of a particular VPN to any other CE router 105-108 of the VPN, even if such routing of data requires use of one or more intervening PE routers 115-117.

The example PE routers 115-117 of FIG. 1 are provisioned and/or configured based on data, information and/or parameters stored in a network and/or VPN configuration database 130. The example configuration database 130 of FIG. 1 defines for each of the example PE routers 115-118 and for each VPN supported by the example service-provider network 110, the set of CE routers 105-108 that are supposed to be communicatively coupled to the PE router 115-118. However, due to any number and/or type(s) of failures, errors, and/or faults, a particular PE router 115-118 may not be actively and/or currently communicatively coupled and/or coupleable to one or more of the CE routers 115-118 despite how the PE routers 115-118 and the CE routers 115-118 are provisioned. Example failures, errors and/or faults include, but are not limited to, network interface faults, router faults, and/or communication path faults. When an operator of a particular VPN and/or an operator of the service-provider network 110 updates the example configuration database 130, the provisioned configuration(s) of the affected PE router(s) 115-118 and/or the affected CE router(s) 105-108 are likewise updated by the example service-provider network 110.

To proactively detect BGP session failures, the example service-provider network 110 of FIG. 1 includes a BGP session monitor 135. By monitoring BGP session status information for the communication system 100, the example BGP session monitor 135 of FIG. 1 can automatically detect BGP session failures prior to, in some instances, a customer becoming aware of and/or reporting a problem, thereby improving customer satisfaction, improving network reliability and/or avoiding network reachability failures. An example manner of implementing the example BGP session monitor 135 of FIG. 1 is described below in connection with FIG. 2. Example processes that may be carried out to implement the example BGP session monitor 135 of FIG. 1 are described below in connection with FIGS. 3-5.

The example BGP session monitor 135 of FIG. 1 compares provisioning information and/or data stored in the configuration database 130 with current and/or active route information acquired via received BGP advertisements and/or messages to determine, identify and/or detect routers 105-108, 115-117 and/or PE-to-CE routes that have failed, are down, are inoperable, and/or are flapping. BGP advertisements and/or messages include, but are not limited to, a BGP message transmitted initial configuration and/or startup to advertise one or more routes, a BGP message transmitted to advertise one or more additional routes, and/or a BGP message transmitted to withdraw one or more routes. As used herein, the term "flapping" refers to a condition characterized by an alternation between two states. For example, a flapping network interface alternates between a working state and an inoperative state. Likewise, an example route that is flapping is alternating between an active state and an inactive state. The route information acquired via received BGP advertisements is indicative of the currently active and/or currently available routes of the communication system 100 and, as described above, may be different from the provisioned configuration of the communication system 100.

The example BGP session monitor 135 of FIG. 1 identifies and/or detects a potential BGP session failure by determining whether a route provisioned in the configuration database 130 is not present in the list of active routes advertised via one or more BGP messages. In examples described herein, the example BGP session monitor 135 determines the number of times that a provisioned route does not appear as an active route during a sliding window of time to determine whether the route and/or a router or network interface associated with the route is down and/or flapping. For example, if a provisioned route is missing throughout the sliding window interval, the route can be declared as down. If other routes associated with the down provisioned route are likewise down, the example BGP session monitor 135 declares that a network interface of a router shared by all of the missing routes and/or the router itself are down. However, if a provisioned route is only missing for a portion of the sliding window, the provisioned route may instead be flapping between an active state and an inactive state, and may benefit from servicing to avoid a complete failure.

To obtain active and/or current route information, the example BGP session monitor 135 of FIG. 1 establishes a passive peered BGP communication session with the example route reflector 125. The example route reflector 125 of FIG. 1 sends and/or forwards a copy of each BGP advertisement that it receives to the BGP session monitor 135 via the communication session. In many examples, a service-provider network 110 includes and/or implements more than one route reflector 125. However, because such route reflectors 125 are implemented, coupled and/or located to distribute BGP advertisements throughout the entire network 110, the example BGP session monitor 135 need only establish a passive and/or peering relationship with a representative subset of the route reflectors 125. For example, the BGP session monitor 135 may select a route reflector 125 from each geographic region and/or logical portion of the service-provider network 110.

When the example BGP session monitor 135 of FIG. 1 detects and/or identifies a BGP session failure, the BGP session monitor 135 automatically generates and/or creates a trouble ticket, and submits the generated trouble ticket to any type of trouble-ticket system 140. In the illustrated example of FIG. 1, the automatically generated trouble ticket includes information useful to effect resolution of the identified problem. An example trouble ticket identifies one or more particular routers, network interfaces and/or communication paths that appear to be faulty. That is, the trouble ticket identifies the cause and/or type of the detected and/or identified BGP session failure.

The example trouble-ticket system 140 of FIG. 1 routes and/or assigns a trouble ticket submitted by the example BGP session monitor 135 to one or more of a customer 150 and/or a work center 155 via any type of interface system 145. For example, the interface system 145 of FIG. 1 can send such notices via pager, text message, email, updated web-based interface display, updated work list, and/or facsimile. Additionally, the example interface system 145 of FIG. 1 implements one or more user interfaces that allow the users 150 and 155 to access the example trouble-ticket system 140. Example user interfaces are web-based interfaces that allow a user to, for example, generate, submit, update, close, forward, route, assign and/or search for trouble tickets.

While an example communication system has been illustrated in FIG. 1, one or more of the interfaces, data structures, elements, processes and/or devices illustrated in FIG. 1 may be combined, divided, re-arranged, omitted, eliminated and/or implemented in any other way. Further, the example PE routers 115-117, the example route reflector 125, the example configuration database 130, the example BGP session monitor 135, the example trouble-ticket system 140, and/or the example interface system 145 of FIG. 1 may be implemented by hardware, software, firmware and/or any combination of hardware, software and/or firmware. Thus, for example, any of the example PE routers 115-117, the example route reflector 125, the example configuration database 130, the example BGP session monitor 135, the example trouble-ticket system 140, and/or the example interface system 145 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a communication system may include interfaces, data structures, elements, processes and/or devices instead of, or in addition to, those illustrated in FIG. 1 and/or may include more than one of any or all of the illustrated interfaces, data structures, elements, processes and/or devices.

Figure 2:
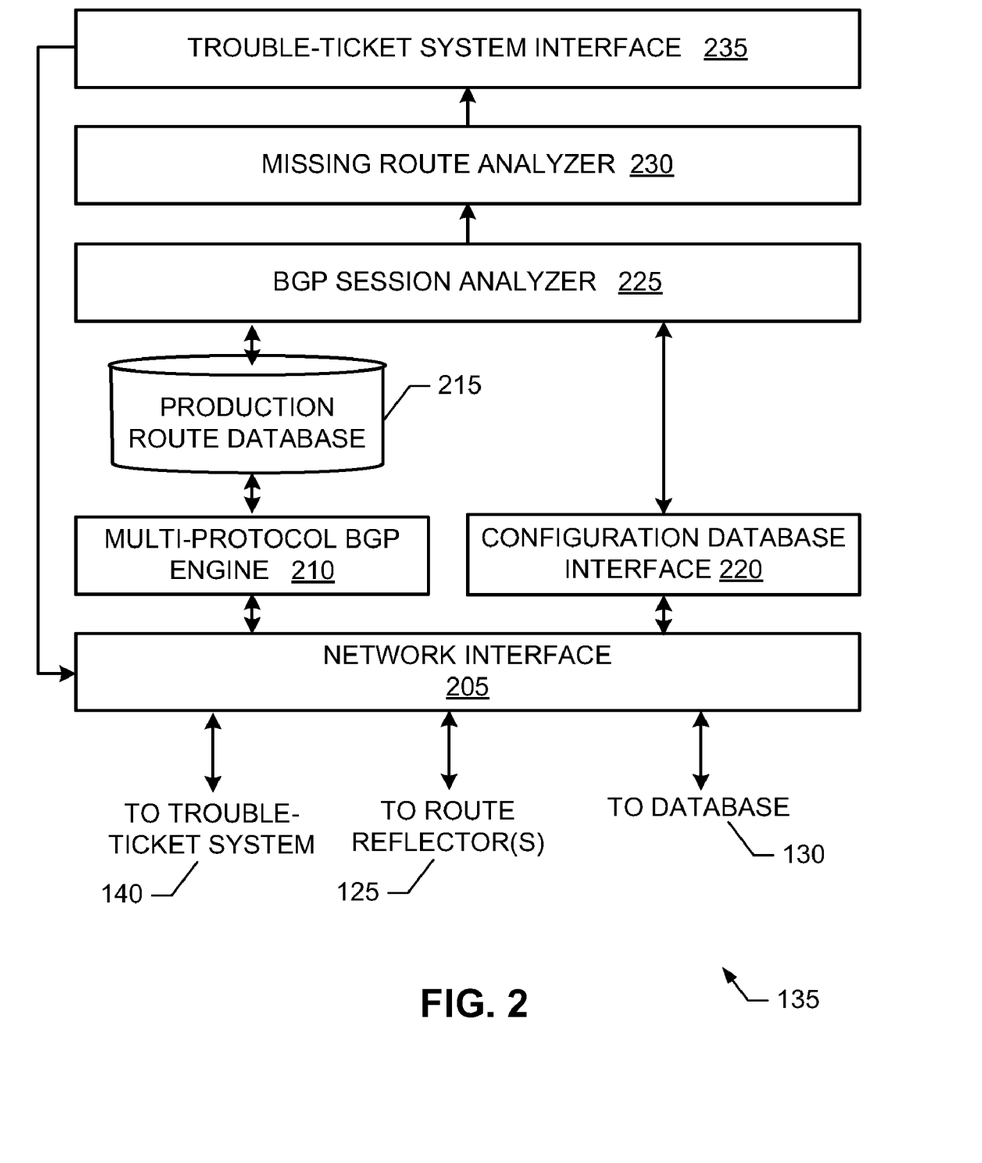
FIG. 2 illustrates an example manner of implementing a border gateway protocol (BGP) session monitor for the example communication system of FIG. 1.

FIG. 2 illustrates an example manner of implementing the example BGP session monitor 135 of FIG. 1. To implement one or more interfaces to the example route reflector 125, the example configuration database 130 and/or the example trouble-ticket system 140, the example BGP session monitor 135 of FIG. 2 includes any type(s) and/or number of network interfaces, one of which is designated at reference numeral 205. An example network interface 205 is implemented in accordance with any past, present and/or future standard, recommendation and/or specification for Ethernet transceivers.

To send, receive and process BGP route advertisements, the example BGP session monitor 135 of FIG. 2 includes any type of multi-protocol BGP engine 210. When a BGP route advertisement is received from the example route reflector 125 via the example network interface 205, the example multi-protocol BGP engine 210 of FIG. 2 stores the routes advertised in the BGP route advertisement in a production route database 215 using, for example, a flat file format. The example multi-protocol BGP engine 210 also establishes a passive peered BGP communication session via which BGP advertisements are received from the route reflector 125.

To obtain provisioning data and/or information, the example BGP session monitor 135 of FIG. 2 includes any type of configuration database interface 220. Using any number and/or type(s) of method(s) and/or application programming interface(s), the example configuration database interface 220 allows a BGP session analyzer 225 to obtain data and/or information representative of provisioned routes for the example communication system 100 (FIG. 1).

To identify missing routes, the example BGP session monitor 135 of FIG. 2 includes the example BGP session analyzer 225. The example BGP session analyzer 225 of FIG. 2 compares the list of active and/or current routes stored in the production route database 215 with a list of provisioned routes obtained via the configuration database interface 220 to identify provisioned routes that are not currently active and/or available within the communication system 100 (FIG. 1). Such routes may be indicative of down, failed and/or flapping routes, routers and/or network interfaces. Example processes that may be carried out to implement the example BGP session analyzer 225 and/or, more generally, the example BGP session monitor 135 are described below in connection with FIGS. 3 and 4.

To analyze missing routes identified by the example BGP session analyzer 225, the example BGP session monitor 135 of FIG. 2 includes a missing route analyzer 230. For a missing route, the example missing route analyzer 230 of FIG. 2 determines and/or counts the number of times that the provisioned route has been missing during a time period, and whether other routes associated with the missing provisioned route are also missing. By analyzing the pattern of missing routes, the example missing route analyzer 230 determines whether and/or which router(s), network interface(s) and/or communication path(s) are down, failed and/or flapping. An example process that may be carried out to implement the example missing route analyzer 230 and/or, more generally, the example BGP session monitor 135 is described below in connection with FIG. 5.

To generate and submit trouble tickets, the example BGP session monitor 135 of FIG. 2 includes any type of trouble-ticket system interface 235. When the example missing route analyzer 230 identifies one or more routes, network interfaces and/or communication paths that are down, failed and/or flapping, the example trouble-ticket system interface 235 of FIG. 2 generates and submits one or more corresponding trouble tickets to the example trouble-ticket system 140 (FIG. 1) via the network interface 205.

While an example BGP session monitor 135 has been illustrated in FIG. 2, one or more of the interfaces, data structures, elements, processes and/or devices illustrated in FIG. 2 may be combined, divided, re-arranged, omitted, eliminated and/or implemented in any other way. Further, the example network interface 205, the example multi-protocol BGP engine 210, the example production route database 215, the example configuration database interface 220, the example BGP session analyzer 225, the example missing route analyzer 230, the example trouble-ticket system interface 235 and/or, more generally, the example BGP session monitor 135 of FIG. 2 may be implemented by hardware, software, firmware and/or any combination of hardware, software and/or firmware. Thus, for example, any or the example network interface 205, the example multi-protocol BGP engine 210, the example production route database 215, the example configuration database interface 220, the example BGP session analyzer 225, the example missing route analyzer 230, the example trouble-ticket system interface 235 and/or, more generally, the example BGP session monitor 135 may be implemented by one or more circuit(s), programmable processor(s), application specific integrated circuit(s) (ASIC(s)), programmable logic device(s) (PLD(s)) and/or field programmable logic device(s) (FPLD(s)), etc. Further still, a BGP session monitor may include interfaces, data structures, elements, processes and/or devices instead of, or in addition to, those illustrated in FIG. 2 and/or may include more than one of any or all of the illustrated interfaces, data structures, elements, processes and/or devices. For example, a BGP session monitor may implement network interfaces for respective ones of the multi-protocol BGP engine 210, the example configuration database interface 220 and the example trouble-ticket system interface 235.

Figure 3:
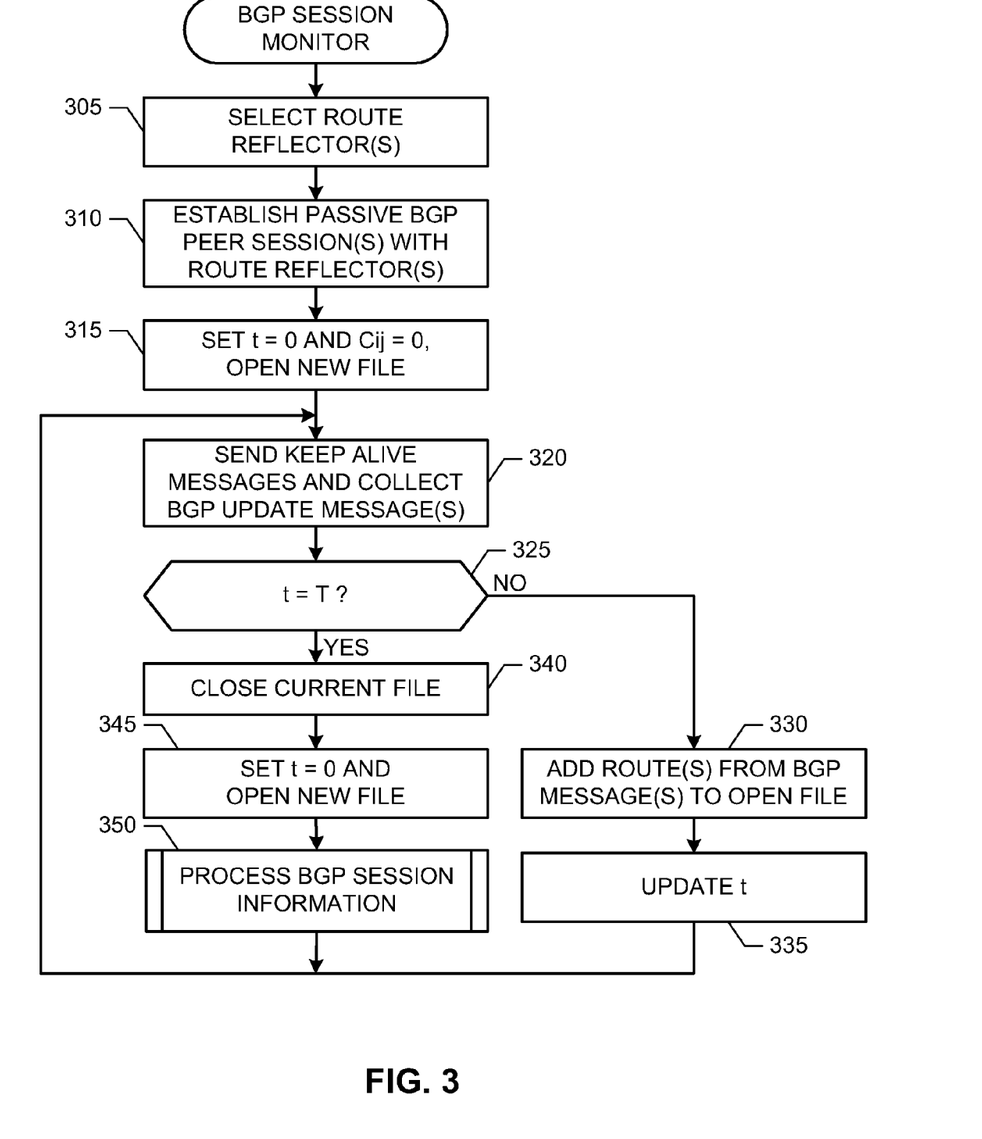
FIGS. 3-5 are flowcharts representative of example processes that may be carried out to implement the example BGP session monitors of FIGS. 1 and/or 2.
Figure 4:
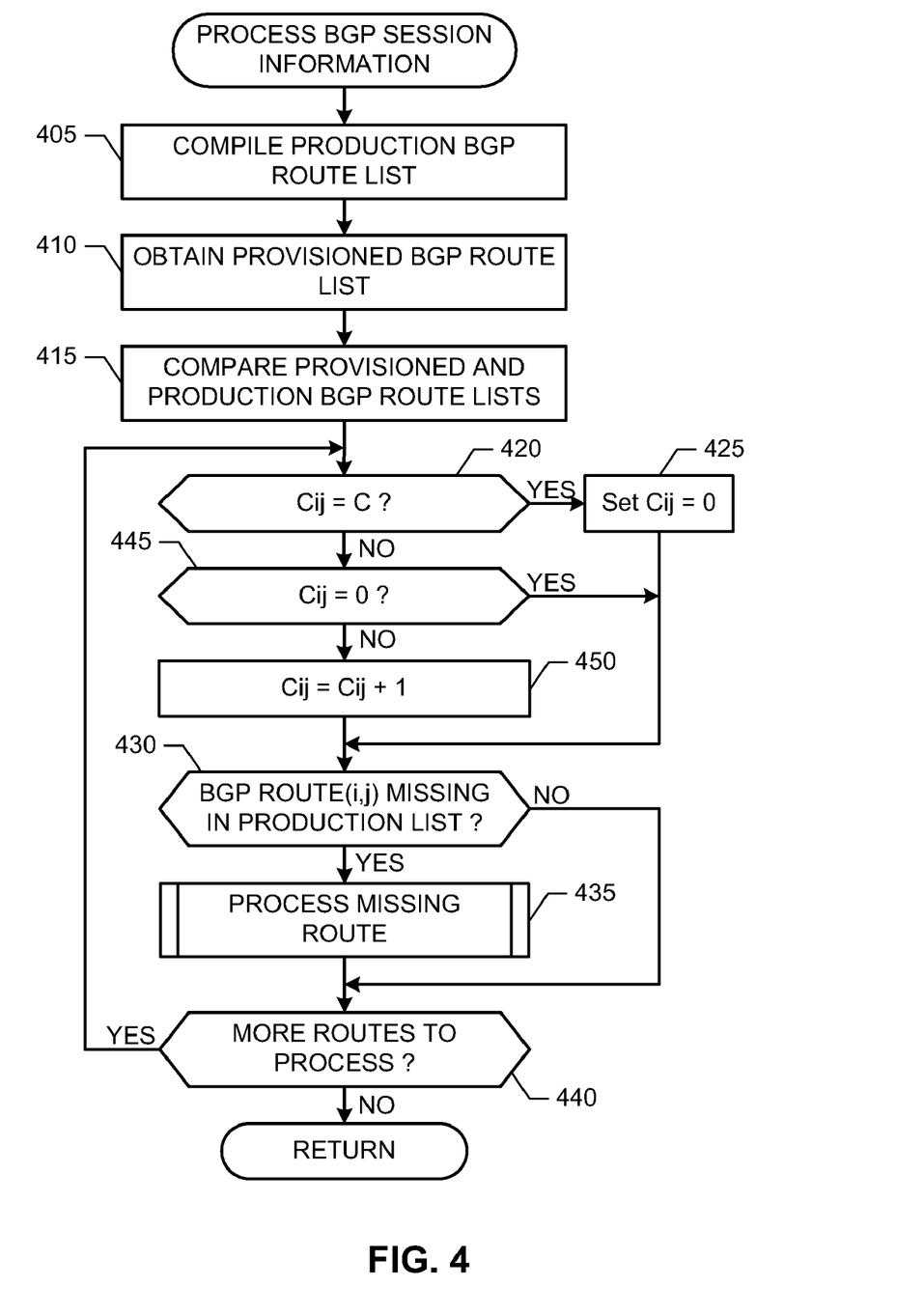
Figure 5:
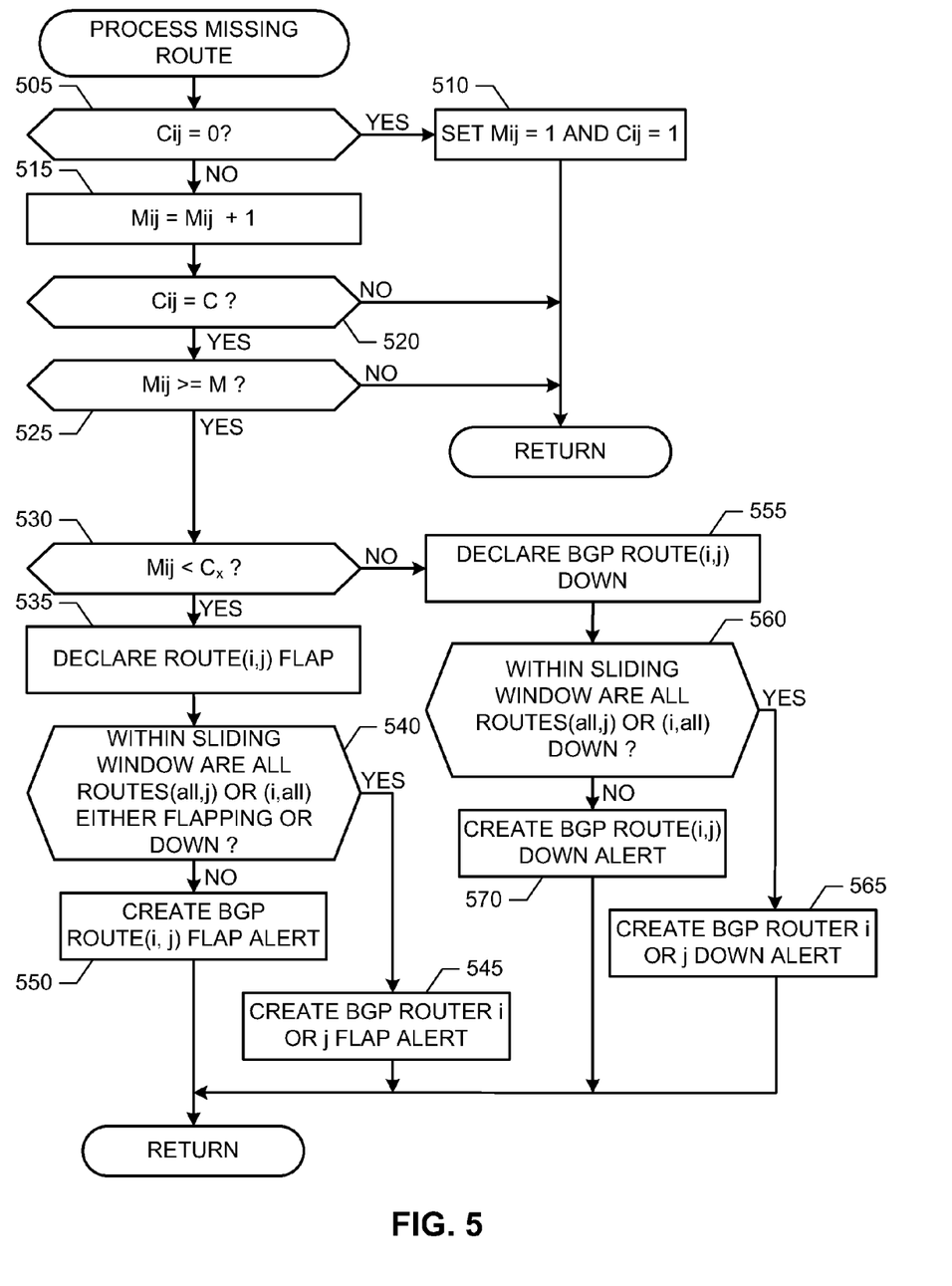

FIGS. 3-5 illustrate flowcharts representative of example processes that may be carried out to implement the example BGP session monitor 135 of FIGS. 1 and/or 2. The example processes of FIGS. 3-5 may be carried out by a processor, a controller and/or any other suitable processing device. For example, the example processes of FIGS. 3-5 may be embodied in coded instructions stored on any tangible computer-readable medium such as a flash memory, a compact disc (CD), a digital versatile disc (DVD), a floppy disk, a read-only memory (ROM), a random-access memory (RAM), a programmable ROM (PROM), an electronically-programmable ROM (EPROM), and/or an electronically-erasable PROM (EEPROM), an optical storage disk, an optical storage device, magnetic storage disk, a magnetic storage device, and/or any other medium which can be used to carry or store program code and/or instructions in the form of machine-accessible instructions or data structures, and which can be accessed by a processor, a general-purpose or special-purpose computer, or other machine with a processor (e.g., the example processor platform P100 discussed below in connection with FIG. 6). Combinations of the above are also included within the scope of computer-readable media. Machine-accessible instructions comprise, for example, instructions and/or data that cause a processor, a general-purpose computer, special-purpose computer, or a special-purpose processing machine to implement one or more particular processes. Alternatively, some or all of the example processes of FIGS. 3-5 may be implemented using any combination(s) of ASIC(s), PLD(s), FPLD(s), discrete logic, hardware, firmware, etc. Also, some or all of the example processes of FIGS. 3-5 may instead be implemented manually or as any combination of any of the foregoing techniques, for example, any combination of firmware, software, discrete logic and/or hardware. Further, many other methods of implementing the example operations of FIGS. 3-5 may be employed. For example, the order of execution of the blocks may be changed, and/or one or more of the blocks described may be changed, eliminated, sub-divided, or combined. Additionally, any or all of the example processes of FIGS. 3-5 may be carried out sequentially and/or carried out in parallel by, for example, separate processing threads, processors, devices, discrete logic, circuits, etc.

The example process of FIG. 3 begins with the example BGP session monitor 135 (FIG. 1) selecting one or more route reflectors 125 (block 305), and the example BGP engine 210 (FIG. 2) establishing passive and/or peered communication sessions with the selected route reflector(s) 125 (block 310). The BGP session monitor 135 sets a variable t to zero, for each provisioned route sets a variable Cij to zero, and opens a new data file in the production route database 215 to store a list of routes advertised in received BGP messages during an upcoming period of time (block 315). The BGP engine 210 begins to send keep alive messages to the route reflector 125 and to receive BGP advertisements from the route reflector 125 (block 320). Until the variable t equals a length T of the time period (block 325), the BGP engine 210 stores route information contained in received BGP advertisements into the open data file (block 330), and updates the variable t (block 335). Control then returns to block 320 to continue sending keep alive messages and received BGP advertisements. In some examples, the variable t is implementing using a real-time clock. For instance, the real-time clock can be reset at block 315 and then the output of the real-time clock can be compared with the value T to detect the end of each BGP advertisement collection period. Additionally or alternatively, the value T can represent a future time such that it is not necessary to reset the real-time clock. That is, T can be computed by adding a length of time to the current output of the real-time clock.

At the end of the time period (block 325), the BGP session monitor 135 closes the current data file (block 340), and resets the variable t to zero and opens a new data file (block 345). The example BGP session analyzer 225 (FIG. 2) processes the production route list stored in the closed data file (block 350) by, for example, carrying out the example processes of FIGS. 4 and 5. That is, all BGP messages receiving during a particular period of time of length T are saved in a data file. At the end of each period of time (block 325), the data file is closed (block 340) and processed (block 350), and another data file is opened for subsequent BGP messages (block 345). Control then returns to block 320 to continue sending keep alive messages and received BGP advertisements. While not depicted in FIG. 3, processing of the previously collected active route information at block 350 continues in parallel with the collection of active route information in the newly opened data file.

The example process of FIG. 4 can be carried out to compare an active list of routes with a provisioned list of routes to identify missing routes and to identify one or more reasons for the missing route(s). The example process of FIG. 4 begins with the example BGP session analyzer 225 of FIG. 2 compiling a list of active routes that were advertised during the previous time period (block 405). In some examples, the BGP session analyzer 225 compiles an ordered list of advertised routes and removes duplicate routes. The example BGP session analyzer 225 obtains a list of provisioned routes via the example configuration database interface 220 (block 410), and compares the list of advertised routes to the list of provisioned routes (block 415).

For a presently considered provisioned route(i,j), the BGP session analyzer 225 checks whether the variable Cij associated with the route(i,j) is equal to a variable C that represents the length of a sliding window (block 420). When the end of the sliding window for the route(i,j) is reached (block 420), the BGP session analyzer 225 resets the variable Cij (block 425). The BGP session monitor 225 determines whether the provisioned route(i,j) is missing from the list of advertised routes (block 430). If the provisioned route(i,j) is missing (block 430), the example missing route analyzer 230 analyzes the missing route by, for example, carrying out the example process of FIG. 5 (block 435). If there are more routes to process (block 440), control returns to block 420 to process the next route.

Returning to block 430, if the provisioned route(i,j) is not missing (block 430), control proceeds to block 440 without further analyzing the route(i,j).

Returning to block 420, if the variable Cij is not equal to C (block 420) and the variable Cij is not equal to zero (block 445), the BGP session analyzer 225 increments the value of the variable Cij (block 450).

The example process of FIG. 5 can be carried out to analyze a missing provisioned route(i,j) identified by the BGP session analyzer 225. For example, the example process of FIG. 5 can be called from block 435 of the example process of FIG. 4. The example process of FIG. 5 begins with the example missing route analyzer 230 of FIG. 3 comparing the variable Cij to zero (block 505). If the variable Cij is zero (block 505), the missing route analyzer 230 initializes a variable Mij, which is used to represent the number of times the route(i,j) is missing, to one and initializes the variable Cij to one to start a sliding window time interval for the route(i,j) (block 510). Control then returns from the example process of FIG. 5 to, for example, the example process of FIG. 4 at block 435.

If the variable Cij is not zero (block 505), the missing route analyzer 230 increments the variable Mij to indicate that the route(i,j) was missing another time (block 515). If the end of the sliding window for the provisioned route(i,j) has not been reached (block 520), control returns from the example process of FIG. 5 to, for example, the example process of FIG. 4 at block 435.

If the end of the sliding window for the provisioned route (i,j) has been reached (block 520), the missing route analyzer 230 compares the variable Mij with a threshold M (block 525). If the variable Mij is less than the threshold M (block 525), control returns from the example process of FIG. 5 to, for example, the example process of FIG. 4 at block 435 without declaring a BGP session failure. The value of the threshold M is selected to avoid false BGP session failure declarations when a particular route is not always advertised during each time interval T, where T represents the length of each BGP message collection window.

Returning to block 525, if the variable Mij is greater than or equal to M (block 525), the missing route analyzer 230 determines whether the variable Mij is less than a threshold $C_x$. The threshold $C_x$ is less or equal to C (block 530). In some example, the threshold $C_x$ is selected to be equal to C. If the variable Mij is less than $C_x$ (block 530), the provisioned route(i,j) is declared to be flapping (block 535). If during the sliding window all routes(all,j) or all routes(i,all) were either flapping or down (block 540), the example trouble-ticket system interface 235 of FIG. 2 creates and submits a trouble ticket indicating that either router i or router j is flapping (block 545). Otherwise (block 540), the example trouble-ticket system interface 235 creates and submits a trouble ticket indicating that route(i,j) is flapping (block 550). Control returns from the example process of FIG. 5 to, for example, the example process of FIG. 4 at block 435.

Returning to block 530, if the variable Mij is not less than the threshold $C_x$ (block 530), the provisioned route(i,j) is declared to be down (block 555). If during the sliding window all routes(all,j) or all routes(i,all) were down (block 560), the example trouble-ticket system interface 235 of FIG. 2 creates and submits a trouble ticket indicating that router i or router j is down (block 565). Otherwise (block 560), the example trouble-ticket system interface 235 creates and submits a trouble ticket indicating that route(i,j) is down (block 570). Control returns from the example process of FIG. 5 to, for example, the example process of FIG. 4 at block 435.

Figure 6:
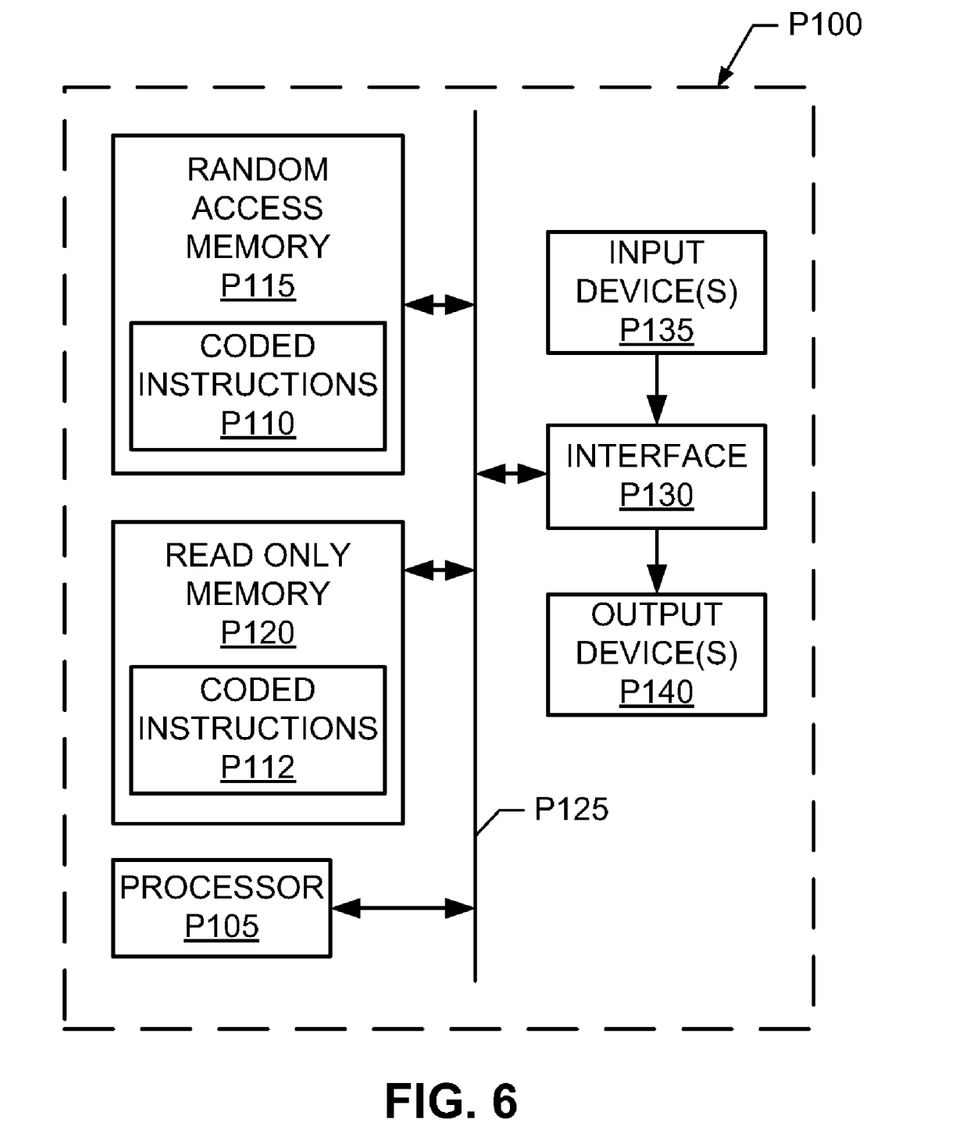
FIG. 6 is a schematic illustration of an example processor platform that may be used and/or programmed to carry out the example processes of FIGS. 3-5 and/or to implement any of all of the methods and apparatus disclosed herein.

FIG. 6 is a schematic diagram of an example processor platform P100 that may be used and/or programmed to implement the example BGP session monitor 135 of FIGS. 1 and/or 2. For example, the processor platform P100 can be implemented by one or more general-purpose processors, processor cores, microcontrollers, etc.

The processor platform P100 of the example of FIG. 6 includes at least one general purpose programmable processor P105. The processor P105 executes coded instructions P110 and/or P112 present in main memory of the processor P105 (e.g., within a RAM P115 and/or a ROM P120). The processor P105 may be any type of processing unit, such as a processor core, a processor and/or a microcontroller. The processor P105 may execute, among other things, the example processes of FIGS. 3-5 to implement the example methods and apparatus described herein.

The processor P105 is in communication with the main memory (including a ROM P120 and/or the RAM P115) via a bus P125. The RAM P115 may be implemented by DRAM, SDRAM, and/or any other type of RAM device, and ROM may be implemented by flash memory and/or any other desired type of memory device. Access to the memory P115 and the memory P120 may be controlled by a memory controller (not shown). One or both of the example memories P115 and P120 may be used to implement the example configuration database 130 of FIG. 1 and/or the example production route database 215 of FIG. 2.

The processor platform P100 also includes an interface circuit P130. The interface circuit P130 may be implemented by any type of interface standard, such as an external memory interface, serial port, general-purpose input/output, etc. One or more input devices P135 and one or more output devices P140 are connected to the interface circuit P130. The input devices P135 and/or output devices P140 may be used to, for example, implement the network interface 205 of FIG. 2.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An apparatus comprising:
   a database interface to obtain provisioned configuration information for a provider edge (PE) router;
   a border gateway protocol (BGP) engine to receive one or more BGP messages from a route reflector, the one or more BGP messages representing a list of active routes for the PE router;
   a session analyzer to compare the list of active routes with the provisioned configuration information to determine whether a provisioned route is not present in the list of active routes, and to declare a BGP session failure when the provisioned route is not present in the list of active routes; and
   a missing route analyzer to count a number of times that the provisioned route is not present in the list of active routes, to compare the number of times to a threshold to determine whether to declare the BGP session failure, to compare the number of times to a second threshold, and to declare that the provisioned route is flapping when the number of times is less than the second threshold.

2. An apparatus as defined in claim 1, wherein the provisioned configuration information comprises a list of provisioned routes between the PE router and one or more customer edge routers.

3. An apparatus as defined in claim 1, wherein the database interface is to obtain the provisioned configuration information from a database used to configure the PE router.

4. An apparatus as defined in claim 1, wherein the BGP engine is to establish a passive peered BGP session with the route reflector, and to receive the one or more BGP messages via the BGP session.

5. An apparatus as defined in claim 1, wherein the missing route analyzer is to count the number of times that the provisioned route is not present in the list of active routes during a sliding window.

6. An apparatus as defined in claim 1, further comprising a production route database to store the list of active routes.

7. A method comprising:
   obtaining provisioning data for a provider edge (PE) router;
   receiving one or more border gateway protocol (BGP) messages from a route reflector, the one or more BGP messages representing a list of active routes for the PE router;
   comparing the list of active routes with the provisioning data to determine whether a provisioned route is not present in the list of active routes; and
   declaring a BGP session failure when the provisioned route is not present in the list of active routes;
   counting a number of times that the provisioned route is not present in the list of active routes;
   comparing the number of times to a threshold to determine whether to declare the BGP session failure;
   comparing the number of times to a second threshold; and
   declaring that the provisioned route is flapping when the number of times is less than the second threshold.

8. A method as defined in claim 7, further comprising declaring that the provisioned route is down when the number of times is not less than the second threshold.

9. A method as defined in claim 7, further comprising:
initiating a sliding window at a first time the provisioned route is not present in the list of active routes; and
counting the number of times the provisioned route is not present in the list of active routes during the sliding window.

10. A method as defined in claim 7, wherein the provisioned configuration information comprises a list of provisioned routes between the PE router and one or more customer edge routers.

11. A tangible article of manufacture storing machine readable instructions that, when executed, cause a machine to:
obtain provisioning data for a provider edge (PE) router;
receive one or more border gateway protocol (BGP) messages from a route reflector, the one or more BGP messages representing a list of active routes for the PE router;
compare the list of active routes with the provisioning data to determine whether a provisioned route is not present in the list of active routes; and
declare a BGP session failure when the provisioned route is not present in the list of active routes;
count a number of times that the provisioned route is not present in the list of active routes;
compare the number of times to a threshold to determine whether to declare the BGP session failure;
compare the number of times to a second threshold; and
declare that the provisioned route is flapping when the number of times is less than the second threshold.

12. A tangible article of manufacture as defined in claim 11, wherein the machine readable instructions, when executed, cause the machine to:
initiate a sliding window at a first time the provisioned route is not present in the list of active routes; and
count the number of times the provisioned route is not present in the list of active routes during the sliding window.

13. A tangible article of manufacture as defined in claim 11, wherein the provisioned configuration information comprises a list of provisioned routes between the PE router and one or more customer edge routers.

\* \* \* \* \*